Patented May 2, 1933

1,906,384

UNITED STATES PATENT OFFICE

MARSHALL LASLEY, OF CHATTANOOGA, TENNESSEE

METHOD FOR TREATMENT OF CERAMIC MATERIALS AND ARTICLES FORMED THEREFROM

No Drawing.    Application filed April 10, 1931. Serial No. 529,283.

This invention relates to a method of preparing argillaceous clays and shales containing impurities such as organic matter, sulfur, ferrous iron and the like, and to a dependable and efficient method of making brick, tile or similar ceramic articles therefrom.

While some natural clays are obtainable which are relatively pure and consist substantially entirely of clay substances or kaolin, many if not most commercial plastic clays and shales which are economically suitable for general ceramic purposes contain appreciable proportions of impurities such as organic matter, iron pyrites, free sulfur and frequently more or less ferrous iron.

Of these impurities, the organic matter and sulfur undergo combustion and volatilize upon being subjected to high temperatures. Consequently, articles molded from such clays tend to swell, crack, or otherwise deteriorate upon being heated. On the other hand, the ferrous iron component, if present, is undesirable because it serves to flux the clay prematurely and before the ultimate vitrification or hardening temperature has been reached.

The general practice of preparing and firing ceramic products at the present time is to grind the raw clay to a sufficiently fine degree of subdivision to facilitate convenience in shaping and finishing and also to develop plasticity, to moisten or mix the clay thoroughly with water, either during or after the grinding operation, to shape the plastic mass to the desired form, and then to dry and subject the shaped product to the firing temperature required to develop its ultimate mechanical strength.

In such procedures, the firing operation is usually carried out in a tunnel or periodic kiln and comprises a preliminary "water-smoking" period, during which the temperature is kept relatively low so that it only gradually expels the mechanically retained water from the fresh or "green" charge of ware. This period, in periodic kilns for example, may require one and a half days or more. When completed the temperature of the kiln may be raised gradually to a sufficient degree (e. g. 1450° F.) to oxidize and slowly expel the various volatile materials which are contained in the raw clay such as organic matter, sulfur, and the like. To thus raise the temperature of the kiln the heating must be increased gradually, usually requiring a half a day, and the ware is held at such temperature for three days, more or less, in order to complete the reaction. Moreover, this heating must be done with extreme care in order to avoid rapid changes or reactions and the consequent danger of cracking, swelling, warping, shrinking, blistering, spalling, etc., which are likely to occur during this stage. The kiln may then be raised to a sufficient temperature (e. g., 1850° F.) for firing or vitrifying the ware. Such rise of temperature requires another half day and the ware is then held at this firing or vitrification temperature for such time as may be required to develop its bonding strength, which is usually two to two and one-half days. The kiln is then allowed to cool gradually and finally opened for removal of the ware at such temperature as experience shows that the ware may be exposed directly to the atmosphere without cracking, checking or otherwise deteriorating.

It will be evident that in such procedures the molded ware—which has already received the labor of being shaped and dried—must be carefully carried through three separate stages of heat treatment after it has been loaded into the kiln. Throughout these stages of treatment the condition of the ware can not be observed (except at isolated points through spaced peep-holes) and substantially no direct or immediate control over the actual temperatures to which it is being subjected is practically possible. Consequently, in such heat treatment not only is the ware subjected to violent physical and chemical changes, but these can only be partially modified and controlled by employing gradual and prolonged periods of time for effecting each rise of temperature of the kiln and by holding each intermediate temperature for a safe interval before continuing the rise of temperature of the kiln. The first stage is allowed for the ware to lose its mechanically retained water. This is followed, in the second stage, by dehydration or liberation and expulsion of the chemically retained water of hydration of the clay which is accompanied by concomitant oxidation and vaporization of the combustible impurities in the clay such as organic matter, sulfur and the like. And finally, the hardening or vitrification of the ware is effected, which develops its mechanical strength. In each of such stages, the physical changes or chemical reactions tend to deform and destroy the ware, as by unequal or excessive shrinkage, swelling, warping, fusing, spalling, cracking, blistering and the like. In addition to these difficulties of control, is the economical consideration that a single charge requires the continuous use of a kiln for some seven or eight days, without including the time required for loading, cooling and unloading the ware from the kiln.

It is therefore an object of this invention to render raw materials of relatively low quality, i. e., containing objectionable impurities, especially of a combustible and volatile nature, suitable for use in the production of satisfactory or improved ceramic ware. It is a further object to provide a method of making ceramic prducts in which the several operations may be more directly and positively effected and controlled; and in which the period of time required for treatment in the kiln may be materially reduced and the output of each kiln proportionately increased. It is, at the same time, an object to improve the uniformity and quality of the products obtained. Other objects will appear from the following disclosure.

In the method of the present invention the raw material, which may be an inherently plastic raw clay or shale, containing various impurities such as indicated above, is first crushed to a relatively fine state of subdivision (e. g. 1/8″ or less in at least one dimension), which may contain some particles of the order of granules but preferably consists in large part of free dust or powder, approaching and including colloidal dimensions. It is then subjected to a heat treatment (e. g. 800° F. more or less), which is adapted on the one hand first to expel mechanical water and then to effect the combustion and volatilization of oxidizable components such as organic matter, sulfur, etc., which it may contain. If carried out at somewhat higher temperatures (e. g. approximately 1400° F.) it is effective to oxidize iron pyrites and to convert ferrous iron compounds, if present, to the ferric state. Such heat treatment is applied to the pulverized raw material, preferably while in a dispersed or extended condition, so that the surfaces are freely and completely exposed (as by agitation) to an oxidizing atmosphere, as for example by spreading out in thin layers and in intimate contact with a circulating stream of air. The heat treatment, moreover, is characteristically limited to a brief interval of time and a relatively high temperature employed, which shall be effective to accomplish the desired oxidation and removal of impurities, but without appreciably affecting the plasticity of the material under treatment. Upon being moistened, the treated and purified material presents the characteristics not only of being free of organic matter, sulfur, pyrites and ferrous iron, but also of having substantially its original plasticity.

Consequently, the ceramic material, as thus prepared, may be mixed with water in the usual way, either in small amounts, as for dry pressing, or with as much as may be required for the shaping operations, and shaped to the required form, and then dried if necessary or desired. The shaped articles may then be loaded into the kiln and, without the usual preliminary low temperature treatments and gradual heating of the kiln, the temperature may be raised directly and continuously to the ultimate firing temperature. This temperature is held for the usual firing period, the kiln is then allowed to cool, the charge withdrawn in the usual way, and the finished product is obtained.

In this method it is to be noted that not only are the lower temperature treatments of the raw material carried out upon it after reducing to a finely comminuted condition and before shaping to the desired form, but such treatments are effected independently of and prior to the kiln treatment. Moreover, owing to the short heat treatment of the finely divided raw clay, it is uniformly and substantially completely freed of organic matter with a low time-temperature factor compared to that which would be necessary if the clay were treated in the form of lumps, even as large as pebbles.

In conjunction with this finely divided and dispersed condition of the pulverized clay, the oxidizing gases, such as the air of the kiln chamber, readily permeate between and into the fine clay particles, an action which they can not have upon lumps of clay or dense layers of any considerable thickness. Consequently, immediate and complete oxidation is accomplished throughout the charge. By thus effecting the rapid oxidation and removal of organic material and sulfur and the oxidation of ferrous iron, if present, to the ferric state, in a short time, relatively high temperatures may be applied; but, on account of its lower rate of reaction, without appreciable loss of the initial plasticity of the material treated.

Since the treated clay is thus substantially liberated from its volatile components it is not subject to serious drying or burning shrinkage nor to expansion such as blistering, swelling, etc. The water of hydration, which it may still retain, is chemically combined, is progressively liberated in subsequent firing over a relatively wide range of temperatures, and the structure of the ware is sufficiently open so that this may freely escape. Consequently the molded shape (after drying off any mechanical water which may have been added for molding purposes) may be heated rapidly and continuously to the ultimate bonding temperature, at which it becomes matured or vitrified, as the case may be, to develop the degree of bonded strength required in the finished product. And this is accomplished without serious or appreciable loss from shrinkage, warping, blistering, or like defects in the finished ware.

A typical and specific instance of practice of the invention will be described as carried out with a hard Alabama shale, having the following composition by analysis:

| | Per cent |
|---|---|
| Moisture at 105° C | 0.28 |
| Loss on ignition | 7.16 |
| $SiO_2$ | 59.12 |
| $Al_2O_3$ | 17.09 |
| $Fe_2O_3$ | 7.84 |
| $TiO_2$ | 0.94 |
| $P_2O_5$ | 0.08 |
| CaO | 0.79 |
| MgO | 2.10 |
| $K_2O$ | 3.40 |
| $Na_2O$ | 1.16 |
| $SO_3$ | 0.48 |
| BaO | trace |
| | 100.16 |

The raw material, as mined, is crushed in a dry pan until reduced to a sufficiently small maximum size to pass an exit opening or screen of appropriate size, in the bottom. For example, an 8 mesh screen may be used, or, with the material above mentioned, rectangular openings $\frac{1}{16}''$ by $\frac{1}{2}''$, which permit thin flakes to pass through, have been used to advantage.

The raw material is thus reduced to fines of which a large part is of extremely small dimensions, as indicated by the following screen separation:

| | Per cent |
|---|---|
| On 10 mesh screen | 0.5 |
| 20 | 23.0 |
| 30 | 14.0 |
| 40 | 7.5 |
| 50 | 5.0 |
| 80 | 8.5 |
| 100 | 2.5 |
| 200 | 10.0 |
| Thru 200 | 29.0 |

This material is now heated, in a dispersed or scattered condition, as by feeding to the top of an inclined sheet iron plate, sloping at such an angle as to cause the material to slide or flow over it slowly, by gravity, and of sufficient length to require a matter of several minutes, depending upon the heating period required.

For example, with the material as above prepared and in a layer approximately $\frac{1}{8}''$ thick, a single passage over an iron plate four feet long in one minute provides an adequate heat treatment,—the plate being heated to about 1400° F. and a current of air being passed over the freely exposed surface of the hot material during the treatment. A layer $\frac{1}{4}''$ thick, however, when treated for two minutes was not sufficiently purified; a treatment of three minutes was almost sufficient, but when continued for five minutes a satisfactory product was obtained.

These data serve to show that even with finely comminuted material a depth of $\frac{1}{4}''$ as compared to $\frac{1}{8}''$ makes a great difference in the heat treatment which is effective upon the protected portions of the charge. And this emphasizes the further fact that solid lumps of clay $\frac{1}{4}''$ or more in diameter will be even more resistant to the penetration of heat. Moreover, in both cases, namely where thicker layers of powdered material or larger lumps are under treatment, while volatile matter may be expelled from the charge or lumps, the gaseous atmosphere of the heating chamber can not effectively penetrate into the lumps or charge, in the opposite direction, adequately to oxidize the inner portions of the lumps or the lower protected layers of pulverized material. Accordingly, in such cases of larger lumps (or even appreciable depths of charge of powdered material to be treated) the temperature applied to the outer surfaces must be excessively high and prolonged, for effective oxidation, and hence would destroy plasticity in the material before satisfactorily oxidizing its impurities.

The roasted material, as above described, may be moistened with water and dry pressed, or mixed with an additional amount of water and then shaped in the usual ways, as for example by extrusion to form bricks or paving blocks. The shaped masses are then dried, either at atmospheric temperature or in a heated dryer (e. g. at 250–300° F. for 8 hours), and may then be loaded directly into the kilns. The kiln may be of either the periodic or continuous tunnel type, and the loading will be carried out accordingly. In either case the loaded kiln or charge may be subjected to a direct, rapid, and continuous rise of temperature up to the ultimate firing temperature. This will, of course, require an appreciable period of time on account of the mass of the kiln structure to be heated, usually 1½ to 2 days for a firing temperature of 1850–1900° F.—but need not be retarded from a consideration of consequent damage to the articles under treatment. The water added to develop the plasticity of the treated material is quickly and freely expelled, owing to its mechanical retention and the open structure of the molded articles. This temperature is substantially maintained for two days, corresponding to the usual "soaking treatment"—after which the kiln is allowed to cool off, in the customary manner, and the contents finally withdrawn.

This application is a continuation in part of my application Serial No. 439,338, filed March 27, 1930, which is in turn a continuation in part of my application, Serial No. 331,711, filed January 10, 1929.

I claim:

1. Method of treating inherently plastic clay or shales containing impurities, comprising the steps of reducing the same to a fine state of subdivision, approximately 8 mesh and finer, and subjecting to heat in intimate contact with an oxidizing atmosphere.

2. Method of treating inherently plastic clay or shales containing impurities, comprising the steps of reducing the same to a fine state of subdivision, approximately 8 mesh and finer, and subjecting to heat in intimate contact with an oxidizing atmosphere and for a short period of time.

3. Method of treating inherently plastic clay or shales containing impurities, comprising the steps of reducing the same to a fine state of subdivision and subjecting to heat, in intimate contact with an oxidizing atmosphere and for a short period of time.

4. Method of treating inherently plastic clay or shales containing impurities, comprising the steps of reducing the same to a fine state of subdivision and subjecting to a temperature of 800–1400° F., in intimate contact with an oxidizing atmosphere.

5. Method of treating inherently plastic clay or shales containing organic impurities comprising the steps of reducing the same to a fine state of subdivision and subjecting to a temperature of approximately 800° F., in intimate contact with an oxidizing atmosphere and for a short period of time.

6. Method of treating inherently plastic clay or shales containing sulfur and/or ferrous iron comprising the steps of reducing the same to a fine state of subdivision and subsequently to a temperature of approximately 1400° F., in intimate contact with an oxidizing atmosphere and for a short period of time.

7. Method of treating inherently plastic clay or shale, containing impurities, comprising the steps of reducing the same to a fine state of subdivision including a large proportion of free dust or substantially colloidal particles, and subjecting to heat, in intimate contact with an oxidizing atmosphere and for a short period of time, without substantial reduction of plasticity.

8. An inherently plastic ferruginous clay or shale characterized by a fine state of subdivision and by having its iron content oxidized to the ferric state, while retaining approximately its initial degree of plasticity.

9. Method of making ceramic articles, comprising the steps of heating an inherently plastic clay or shale, containing impurities in a fine state of subdivision in intimate contact with an oxidizing atmosphere for a brief period of time, shaping the material to the desired form, and heating directly to the firing temperature of the ware.

10. Method of making ceramic articles comprising the steps of heating an inherently plastic clay or shale, containing impurities, in a fine state of subdivision in intimate contact with an oxidizing atmosphere for a brief period of time, shaping the material to the desired form, and heating directly and with continuous rise of temperature to the firing temperature of the ware.

11. Method of making ceramic articles, comprising the steps of heating an inherently plastic clay or shale, containing impurities in a fine state of subdivision in intimate contact with an oxidizing atmosphere to a temperature of 800–1400° F. for a brief period of time, shaping the material to the desired form, and heating directly to the firing temperature of the ware.

12. Method of making ceramic articles, comprising the steps of heating an inherently plastic clay or shale, containing organic impurities, in a fine state of subdivision in intimate contact with an oxidizing atmosphere to a temperature of approximately 800° F., for a brief period of time, shaping the material to the desired form, and heating directly to the firing temperature of the ware.

13. Method of making ceramic articles, comprising the steps of heating an inherently plastic clay or shale, containing ferrous iron impurities, in a fine state of subdivision in intimate contact with an oxidizing atmosphere to a temperature of approximately 1400° F. for a brief period of time, shaping the material to the desired form, and heating directly to the firing temperature of the ware.

14. Method of making ceramic articles, comprising the steps of heating an inherently plastic clay or shale, containing impurities in a fine state of subdivision, approximately 8 mesh and finer in intimate contact with an oxidizing atmosphere for a brief period of time, shaping the material to the desired form, and heating directly to the firing temperature of the ware.

15. Method of treating inherently plastic clay or shales containing impurities, comprising the steps of reducing the same to a fine state of subdivision, approximately eight mesh or finer, and subjecting to a temperature of approximately 800 to 1400° F., in contact with an oxidizing atmosphere for an effective period of approximately one to four minutes, in a layer approximately one quarter inch thick or less.

16. Method of treating inherently plastic clay or shales containing impurities, comprising the steps of reducing the same to a fine state of subdivision and subjecting to heat, in intimate contact with an oxidizing atmosphere and for a short period of time without substantial reduction of plasticity.

Signed by me at Chattanooga, Tennessee, this 8th day of April, 1931.

MARSHALL LASLEY.